Dec. 18, 1945.    M. H. WILLIAMS    2,391,213
BRAKE SHOE ASSEMBLING AND DISASSEMBLING DEVICE
Filed May 13, 1944    2 Sheets-Sheet 1
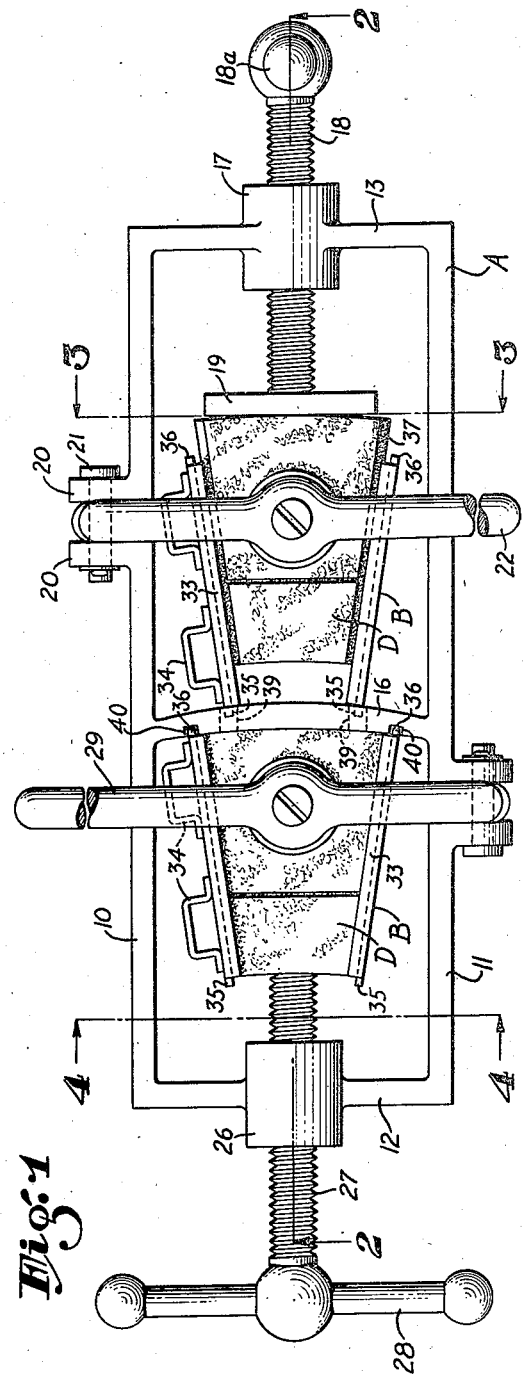
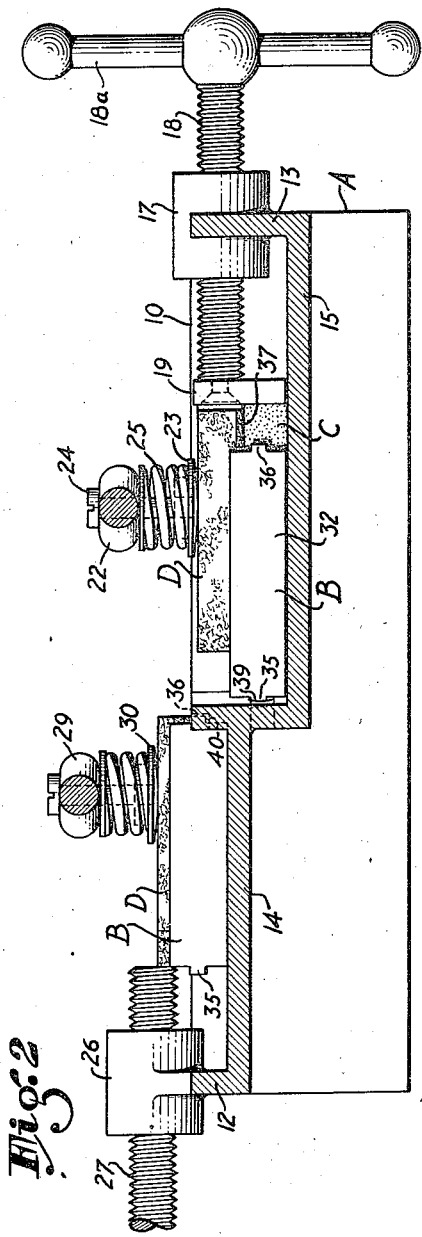
INVENTOR.
Miles H. Williams
BY
Joseph Harris
Atty Dec. 18, 1945.  M. H. WILLIAMS  2,391,213
BRAKE SHOE ASSEMBLING AND DISASSEMBLING DEVICE
Filed May 13, 1944  2 Sheets-Sheet 2
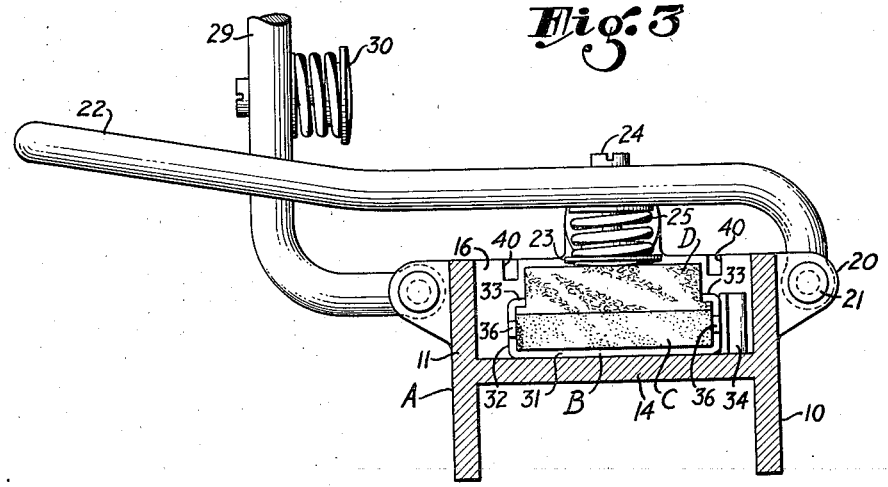
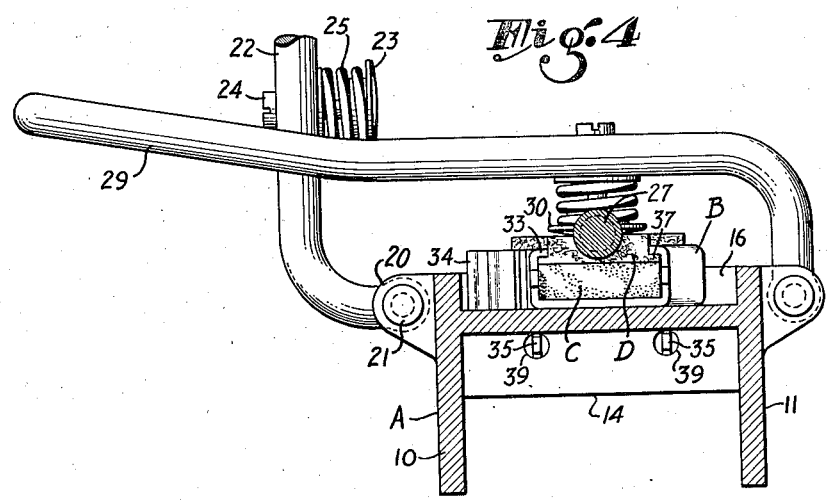
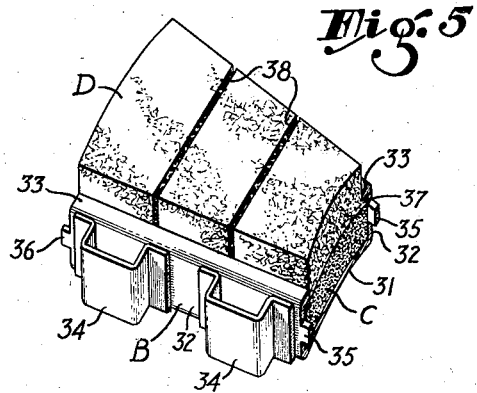
INVENTOR.
BY Miles H. Williams
Joseph Harris
Atty Patented Dec. 18, 1945

2,391,213

UNITED STATES PATENT OFFICE 2,391,213

BRAKE SHOE ASSEMBLING AND DISASSEMBLING DEVICE

Miles H. Williams, Los Angeles, Calif.

Application May 13, 1944, Serial No. 535,487

2 Claims. (Cl. 29—256)

This invention relates to improvements in brake shoe assembling and disassembling device and, more particularly, devices for assembling and disassembling brake shoes such as used on modern high speed railway cars.

A common type of brake shoe now used on high speed trains of today, comprises, broadly, a metal holder, a friction block or liner and a resilient pad or cushion interposed between the friction block and holder. Due to comparatively rapid wear of the friction block in service, frequent renewal of the blocks is necessary and this may occur at different points along the line where help skilled in the assembling of such shoes is not available. Heretofore, the customary method of assembling these brake shoes for renewal, has been to clamp the holder in a vise or equivalent device and then drive the friction block, which is wedge-shaped, into position with a hammer or the like.

This procedure is not only slow and inefficient but very frequently results in injury to or breakage of the friction block, which is of a more or less brittle character, and fails to insure accurate positioning of the friction block with reference to the holder which is highly essential to efficient functioning of the brake shoe when in service.

One object of the present invention, therefore, is to provide a simple, relatively inexpensive device by which brake shoes of the type referred to, may be quickly assembled by even unskilled operators, with certain assurance that the assembly will be correct and without danger of injury to any of the brake shoe parts during the assembling operation.

Another object of the invention is to provide a device of the character indicated which may also be employed with equal facility for removing worn friction blocks from the brake shoes.

Other objects of the invention will more clearly appear from the description and claims hereinafter following.

In the drawings forming a part of this specification, Figure 1 is a top plan view of a device embodying one form of the invention. Figure 2 is a longitudinal, vertical section corresponding to the section line 2—2 of Figure 1. Figures 3 and 4 are transverse vertical sectional views corresponding to the section lines 3—3 and 4—4, respectively, of Figure 1. And Figure 5 is a perspective of the type of brake shoe with which the present invention is primarily concerned.

In said drawings, the improved device is shown as comprising a main base or frame designated generally by the reference character A. Said frame is preferably of rectangular outline with side walls 10 and 11; end walls 12 and 13; vertically offset, horizontal webs or supporting tables or platforms 14 and 15; and an intermediate, arcuate transverse partition 16, all preferably cast integral.

The right hand end of the device, as viewed in Figures 1 and 2, is that used in assembling the shoe parts. For this operation, the arcuate partition 16 has its convex surface presented toward the right, as shown, and the supporting table or platform 15 disposed below the other table or platform 14, for reasons which will appear hereinafter in connection with the description of the brake shoe assembly. The end wall 13 is provided with a threaded nut section 17 with which cooperates a threaded rod 18 adapted to be readily rotated by handle 19 at its outer end. At its inner end, the rod 18 is swivelled to a pusher plate 19 which slides back and forth on the supporting table 15 as will be apparent.

Pivotally attached to suitable ears 20—20 on one of the side walls (10 as shown) by pivot pin 21, is a transversely swinging lever, 22 which, on its under side at a point adapted to engage approximately the center of the brake shoe friction block, carries a presser plate 23. The latter is slightly rounded on its bottom face and is movably connected to lever 22 by a short plunger 24 slidable through the lever. The plate 23 is yieldingly held in extended position by spring 25 interposed between the plate 23 and lever 22, as shown.

The left hand end of the device, as viewed in Figures 1 and 2, is employed to disassemble the brake shoe parts. As is evident, the concave side of the central partition or abutment wall 16 is faced toward the left and the supporting table 14 is at a lesser distance below the top edge of the partition 16 than the table 15. Threaded in the nut section 26 of the end wall 12 is a pusher rod 27 also adapted to be actuated by a handle 28. A lever 29 with a spring influenced presser plate 30, similar to the lever 22 and presser plate 23, is pivotally connected to a side wall of the main frame, preferably the opposite wall 11 to that to which the lever 22 is attached. In the case of the pusher rod 27 no plate is used at its inner end for reasons that will be apparent later.

To more fully understand the mode of use of the assembling and disassembling device, a detailed description of the brake shoe assembly is necessary. The shoe, as shown, comprises a holder designated generally by the reference character B; a resilient pad or backing C and the friction block or liner D. All three elements B, C and D are longitudinally tapered or wedge shaped as evident from Figures 1 and 5.

The holder B is of generally channel shape in transverse section with a bottom wall 31 and side walls 32—32, the latter having in-turned retainer flanges 33—33 for the resilient pad C and friction block D. For attachment to the brake rigging, the holder B is provided along one side thereof with rectangular loops 34—34 and at its ends with sets of positioning lugs 35—35 at the narrow end and 36—36 at the wide end. The friction block D is formed with laterally extended flanges 37—37 which engage under the holder flanges 33—33 to thereby retain the parts in position when properly assembled. The friction block is commonly made of a composition that is hard and more or less brittle and preferably scored on its operative face as indicated at 38.

To assemble the brake shoe, the following procedure is followed. The holder B is first placed on the table 15 with the narrow end of the holder against the partition or abutment wall 16 and is centered by entering the two lugs 35—35 in correspondingly spaced holes 39—39 in said partition 16. The resilient pad C and friction block D are then placed loosely in the holder B after which the lever 22 and presser plate 23 are swung down to engage the top of the friction block. While sufficient downward pressure is maintained on the block D to compress the pad C so as to permit the block flanges 37 to slide easily beneath the holder flanges 33, the pusher plate 19 is forced inwardly by turning the screw rod 18 as will be evident. This action is continued until the pad C and block D are driven completely home against the partition or abutment wall 16 whereupon the lever 22 is released and the pusher plate withdrawn.

With the improved device, as will be evident, there is complete assurance of final accurate positioning of the parts and all danger of breaking, fracturing or distorting the flanges 33 and/or lugs 35 and 36 is avoided, such as has heretofore been common with the hammer method of assembling.

To disassemble the brake shoe, the latter is placed in the opposite end of the device with the wide end against the abutment wall 16. In this case, due to the higher level of the table 14, the friction block D is at a level above the top of the wall 16, even when somewhat depressed by the lever 29 and presser plate 30. In this procedure, the lugs 36 of the holder B are entered in notches 40—40 of the wall 16. It will further be observed that the pusher rod 27 is at such level that it will engage only the friction block so that, when actuated, only the friction block is pushed out. In the disassembling operation, as in the assembling operation, danger of breakage or deforming of any of the parts is eliminated, particularly the lugs 35 and 36.

From the preceding description, it will be seen that the improved device not only permits assembling and disassembling of the brake shoes much more rapidly than by the former hammer method but additionally insures accurate assembly and eliminates danger of injury to the parts.

Although there has herein been shown and described what is now considered the preferred form of the invention, the same is merely illustrative and all changes and modifications are contemplated that come within the scope of the appended claims.

What is claimed is:

1. In a device for assembling brake shoes of the type having wedge shaped holder and friction block with an interposed resilient pad, the combination with a member having a horizontally disposed supporting table and an abutment wall at one end thereof for the shoe holder; of a pressure applying element movable lengthwise of the table toward said wall; and yieldable, vertically downward pressure applying means above the table located intermediate said element and abutment wall, said means comprising a transversely extending lever having a dependent spring pressed plate to engage the top of the friction block while being actuated by the pressure element.

2. In a device for assembling and disassembling brake shoes of the type having wedge shaped holder and friction block with interposed resilient pad, the combination with a member having two supporting tables at different levels and an intermediate abutment wall; of two pressure applying elements operative in opposite directions longitudinally of and above the respective tables toward the abutment wall; and yieldable pressure applying means disposed over each of the tables and located intermediate the corresponding pressure applying element and abutment wall, the level of the higher of said tables being such that the friction block of the brake shoe is supported at a level above the top of the abutment wall.

MILES H. WILLIAMS.